(12) United States Patent
Suciu et al.

(10) Patent No.: US 10,006,302 B2
(45) Date of Patent: *Jun. 26, 2018

(54) TURBOMACHINE THERMAL MANAGEMENT

(71) Applicant: United Technologies Corporation, Hartford, CT (US)

(72) Inventors: Gabriel L. Suciu, Glastonbury, CT (US); Simon Pickford, South Glastonbury, CT (US); William K. Ackermann, East Hartford, CT (US); Nathan Snape, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 314 days.

This patent is subject to a terminal disclaimer.

(21) Appl. No.: 14/788,345

(22) Filed: Jun. 30, 2015

(65) Prior Publication Data

US 2015/0300187 A1 Oct. 22, 2015

Related U.S. Application Data

(63) Continuation of application No. 13/437,296, filed on Apr. 2, 2012, now Pat. No. 9,127,566.

(51) Int. Cl.
*F01D 9/06* (2006.01)
*F01D 1/02* (2006.01)
(Continued)

(52) U.S. Cl.
CPC ............... *F01D 9/065* (2013.01); *F01D 1/02* (2013.01); *F01D 5/02* (2013.01); *F01D 9/02* (2013.01); *F01D 25/12* (2013.01); *F02C 7/04* (2013.01); *F02C 7/047* (2013.01); *F02C 7/18* (2013.01); *F02C 7/32* (2013.01); *F05D 2220/30* (2013.01); *F05D 2260/20* (2013.01); *F05D 2260/213* (2013.01); *Y02T 50/675* (2013.01)

(58) Field of Classification Search
CPC ..... F01D 1/02; F01D 5/02; F01D 9/02; F01D 9/065; F01D 25/12; F02C 7/047; F02C 7/18; F02C 7/32; F02C 7/04; F05D 2220/30; F05D 2260/20; F05D 2260/213; Y02T 50/675

See application file for complete search history.

(56) References Cited

U.S. PATENT DOCUMENTS 2,318,233 A 5/1943 Keller
2,680,345 A 6/1954 Frost
(Continued)

FOREIGN PATENT DOCUMENTS

EP 2042428 4/2009

OTHER PUBLICATIONS

Extended European Search Report for Application No. 13813624.7 dated Nov. 24, 2015.

(Continued)

*Primary Examiner* — Igor Kershteyn
(74) *Attorney, Agent, or Firm* — Carlson, Gaskey & Olds, P.C.

(57) ABSTRACT

An example turbomachine assembly includes, among other things, a nose cone of a turbomachine, and a pump at least partially within an interior of the nose cone. The pump is selectively rotated by a motor to communicate air to the interior.

21 Claims, 4 Drawing Sheets

(51) Int. Cl.
    *F01D 25/12*     (2006.01)
    *F01D 5/02*     (2006.01)
    *F01D 9/02*     (2006.01)
    *F02C 7/18*     (2006.01)
    *F02C 7/32*     (2006.01)
    *F02C 7/047*     (2006.01)
    *F02C 7/04*     (2006.01)

(56) References Cited

U.S. PATENT DOCUMENTS

| | | |
|---|---|---|
| 3,834,157 A | 9/1974 | Hoffmann |
| 3,901,627 A | 8/1975 | Sullivan |
| 4,722,666 A | 2/1988 | Dennison et al. |
| 4,934,140 A | 6/1990 | Dennison et al. |
| 4,999,994 A | 3/1991 | Riid et al. |
| 5,148,673 A | 9/1992 | Enderle |
| 5,402,636 A | 4/1995 | Mize et al. |
| 5,573,378 A | 11/1996 | Barcza |
| 5,833,435 A | 11/1998 | Smith |
| 6,120,245 A | 9/2000 | Uematsu et al. |
| 7,306,432 B2 | 12/2007 | Rockarts et al. |
| 7,419,364 B2 | 9/2008 | Ramstein et al. |
| 7,938,368 B2 | 5/2011 | Hogate |
| 9,115,593 B2 * | 8/2015 | Suciu .................. F02C 7/047 |
| 2004/0006994 A1 | 1/2004 | Walsh et al. |
| 2009/0060748 A1 | 3/2009 | Landa et al. |
| 2009/0120099 A1 | 5/2009 | Brand et al. |
| 2010/0215507 A1 | 8/2010 | Breakwell |
| 2010/0226786 A1 | 9/2010 | Mahan |
| 2011/0236217 A1 | 9/2011 | Bottome |

OTHER PUBLICATIONS

International Preliminary Report on Patentability for PCT Application No. PCT/US2013/034045, dated Oct. 16, 2014.
International Search Report and Written Opinion for International Application No. PCT/US2013/034045 dated Jan. 20, 2014.

* cited by examiner

TURBOMACHINE THERMAL MANAGEMENT

CROSS-REFERENCE TO RELATED APPLICATIONS

This application is a continuation of U.S. application Ser. No. 13/437,296, which was filed on 2 Apr. 2012 and is incorporated herein by reference.

BACKGROUND

This disclosure relates to thermal management within a turbomachine.

Turbomachines, such as gas turbine engines, typically include a fan section, a compressor section, a combustor section, and a turbine section. These sections are axially sequentially arranged. Turbomachines may employ a geared architecture connecting the fan section and the compressor section.

In many turbomachines, some of the air in the compressor section is returned to the fan section. This returned air helps limit ice build-up, buffers seals, etc.

SUMMARY

A turbomachine assembly according to an exemplary aspect of the present disclosure includes, among other things, a nose cone of a turbomachine, and a pump at least partially within an interior of the nose cone. The pump is selectively driven by a motor to communicate air to the interior.

In a further non-limiting embodiment of the foregoing turbomachine assembly, the pump may communicate air through an aperture provided by a leading edge of the nose cone relative to a direction of flow through the turbomachine.

In a further non-limiting embodiment of either of the foregoing turbomachine assemblies, the nose cone may establish a portion of a radially inner boundary of flow entering a fan section of the turbomachine.

In a further non-limiting embodiment of any of the foregoing turbomachine assemblies, an inlet to a low pressure compressor of the turbomachine is downstream from the fan relative to a general direction of flow through the turbomachine.

In a further non-limiting embodiment of any of the foregoing turbomachine assemblies, the assembly may include a geared architecture rotatably linking a fan to a shaft. The geared architecture may cause the fan to rotate at a different speed than the shaft.

In a further non-limiting embodiment of any of the foregoing turbomachine assemblies, the pump may be selectively rotated by the motor or a shaft directly driven by a turbine of the turbomachine.

In a further non-limiting embodiment of any of the foregoing turbomachine assemblies, the assembly may include a clutch that is selectively moved between an engaged position and a disengaged position to rotate the pump using the motor or the shaft.

In a further non-limiting embodiment of any of the foregoing turbomachine assemblies, the clutch may be a ratchet clutch.

In a further non-limiting embodiment of any of the foregoing turbomachine assemblies, the clutch may be in an engaged position when rotating the pump using the shaft.

In a further non-limiting embodiment of any of the foregoing turbomachine assemblies, the shaft may directly drive the pump at a 1 to 1 ratio when the clutch is in the engaged position.

In a further non-limiting embodiment of any of the foregoing turbomachine assemblies, the assembly may include a heat exchanger that receives air communicated to the interior by the pump.

In a further non-limiting embodiment of any of the foregoing turbomachine assemblies, the heat exchanger may be forward a fan blade section of the turbomachine relative to a direction of flow through the turbomachine.

In a further non-limiting embodiment of any of the foregoing turbomachine assemblies, air communicated to the interior by the pump may carry thermal energy from the heat exchanger.

In a further non-limiting embodiment of any of the foregoing turbomachine assemblies, air that has moved to the interior may add thermal energy to the nose cone.

In a further non-limiting embodiment of any of the foregoing turbomachine assemblies, air that has moved to the interior may buffer a seal.

In a further non-limiting embodiment of any of the foregoing turbomachine assemblies, the turbomachine may have a bypass flowpath. Air that has moved through to the interior may be communicated from an inner diameter of the core flowpath to an outer diameter of the core flowpath.

A turbomachine assembly according to another exemplary aspect of the present disclosure includes, among other things, a nose cone having an interior extending forward a fan section of a turbomachine, and a pump that is selectively driven by a shaft or a motor to communicate air to the interior. The pump rotates at the same speed as the shaft when the pump is driven by the shaft. The pump rotates at the same speed as the motor when the pump is driven by the motor.

In a further non-limiting embodiment of the foregoing turbomachine assembly, the shaft may rotate at the same speed as a low-speed spool of the turbomachine when the pump is driven by the shaft.

In a further non-limiting embodiment of either of the foregoing turbomachine assemblies, the assembly may include a geared architecture that is driven by the shaft to rotate a fan of the turbomachine at a higher rotational speed than the shaft.

A method of communicating air within a turbomachine according to another exemplary aspect of the present disclosure includes, among other things, using a pump to move air along a path from a first position outside a nose cone interior directly to a second position within the nose cone interior, and selectively driving the pump using a shaft or a motor. The pump rotates at the same speed as the shaft when the pump is driven by the shaft, and the pump rotates at the same speed as the motor when the pump is driven by the motor.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
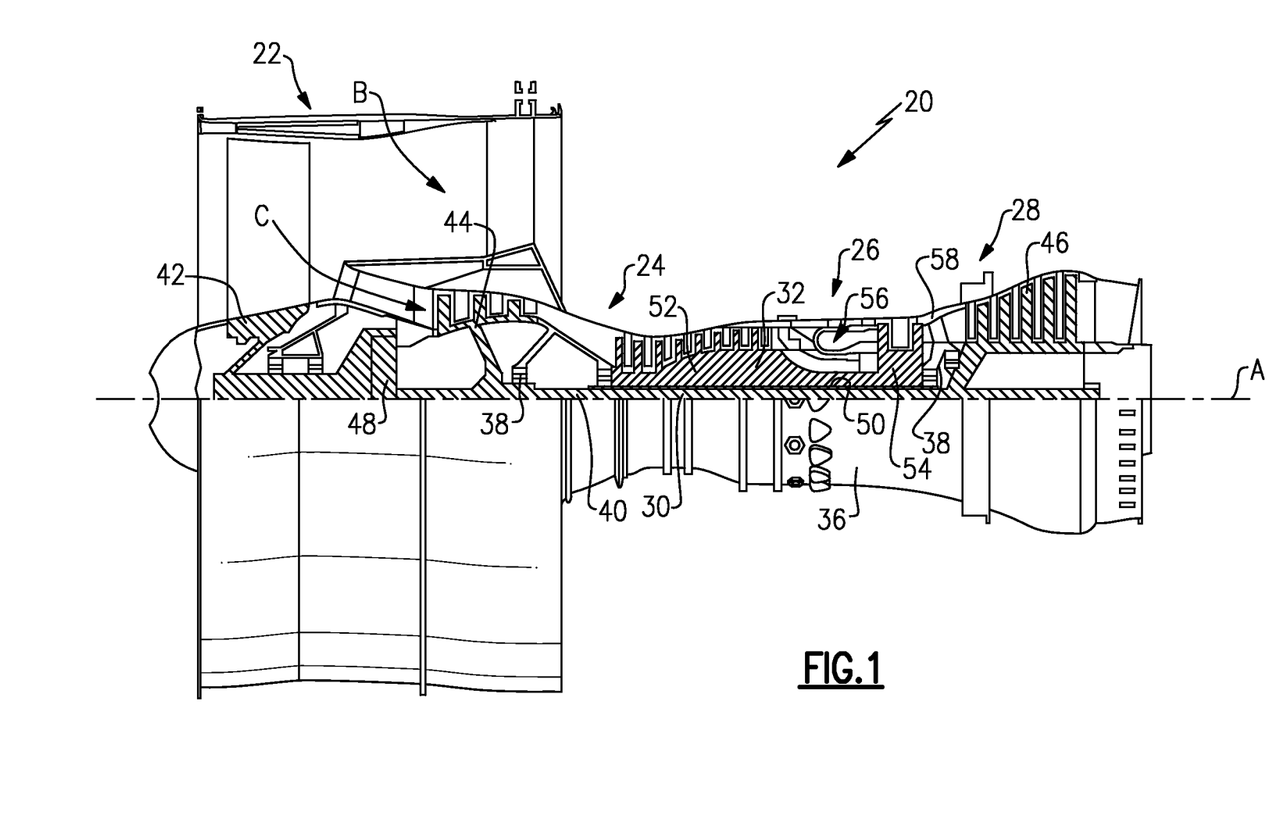
FIG. 1 shows a partial section view of an example turbomachine.

FIG. 1 schematically illustrates an example turbomachine, which is a gas turbine engine 20 in this example. The gas turbine engine 20 is a two-spool turbofan gas turbine engine that generally includes a fan section 22, a compressor section 24, a combustion section 26, and a turbine section 28. Other examples may include an augmentor section (not shown) among other systems or features.

Although depicted as a two-spool turbofan gas turbine engine in the disclosed non-limiting embodiment, it should be understood that the concepts described herein are not limited to use with turbofans. That is, the teachings may be applied to other types of turbomachines and turbine engines including but not limited to one or three-spool architectures. The number of stages in each engine module also may vary.

In the example engine 20, the fan section 22 drives air along a bypass flowpath B while the compressor section 24 drives air along a core flowpath C. Compressed air from the compressor section 24 is mixed with fuel and ignited in the combustion section 26. The products of combustion expand through and drive the turbine section 28.

The example engine 20 generally includes a low-speed spool 30 and a high-speed spool 32 mounted for rotation about an engine longitudinal axis A relative to an engine static structure 36. The low-speed spool 30 and the high-speed spool 32 are rotatably supported by several bearing systems 38. It should be understood that various bearing systems 38 at various locations may alternatively, or additionally, be provided.

The low-speed spool 30 generally includes an inner shaft 40 that interconnects a fan rotor 42, a low-pressure compressor 44, and a low-pressure turbine 46. As illustrated, the inner shaft 40 is connected to the fan rotor 42 through a sped reduction device 48 to drive the fan rotor 42 at a lower speed than the low-speed spool 30. The low-speed spool 30 is low-speed relative to the rotational speed of the high-speed spool 32. The high-speed spool 32 includes an outer shaft 50 that couples a high-pressure compressor 52 and high-pressure turbine 54.

The combustion section 26 includes a circumferential array of fuel nozzles 56 generally arranged axially between the high-pressure compressor 52 and the high-pressure turbine 54.

An optional mid-turbine frame 58 of the engine static structure 36 is generally arranged axially between the high-pressure turbine 54 and the low-pressure turbine 46. The mid-turbine frame 58 supports the bearing systems 38 in the turbine section 28 in this particular configuration.

The inner shaft 40 and the outer shaft 50 are concentric and rotate via the bearing systems 38 about the engine central longitudinal axis A, which is collinear with the longitudinal axes of the inner shaft 40 and the outer shaft 50. The shafts are counter-rotating, but may be co-rotating in another example.

In the example engine 20, the airflow moved along the core flowpath C is compressed by the low-pressure compressor 44 then the high-pressure compressor 52, mixed and burned with fuel in the combustors fuel nozzles 56, then expanded over the high-pressure turbine 54 and low-pressure turbine 46. The high-pressure turbine 54 and the low-pressure turbine 46 rotatably drive the respective high-speed spool 32 and low-speed spool 30 in response to the expansion.

In some non-limiting examples, the engine 20 is a high-bypass geared aircraft engine. In a further example, the engine 20 bypass ratio is greater than about 6 (6 to 1).

The speed reduction device 48 of the example engine 20 includes an epicyclic gear train, such as a planetary, star, or differential gear system. The example epicyclic gear train has a gear reduction ratio of greater than about 2.2 (2.2 to 1).

The low-pressure turbine 46 pressure ratio is pressure measured prior to inlet of low-pressure turbine 46 as related to the pressure at the outlet of the low-pressure turbine 46 prior to an exhaust nozzle of the engine 20. In one non-limiting embodiment, the bypass ratio of the engine 20 is greater than about 10 (10 to 1), the fan diameter is significantly larger than that of the low pressure compressor 44, and the low-pressure turbine 46 has a pressure ratio that is greater than about 5 (5 to 1). The speed reduction device 48 of this embodiment is an epicyclic gear train with a gear reduction ratio of greater than about 2.4 (2.4 to 1). It should be understood, however, that the above parameters are only exemplary of one embodiment of a geared architecture engine and that the present disclosure is applicable to other gas turbine engines including direct drive turbofans.

In this embodiment of the example engine 20, a significant amount of thrust is provided by the flow through the bypass flowpath B due to the high bypass ratio. The fan section 22 of the engine 20 is designed for a particular flight condition—typically cruise at about 0.8 Mach and about 35,000 feet (10,668 meters). This flight condition, with the engine 20 at its best fuel consumption, is also known as bucket cruise. Thrust Specific Fuel Consumption (TSFC) is an industry standard parameter of fuel consumption per unit of thrust.

Fan Pressure Ratio is the pressure ratio across a blade of the fan section 22, typically without the use of a Fan Exit Guide Vane system. The low Fan Pressure Ratio according to one non-limiting embodiment of the example engine 20 is less than 1.45.

Low Corrected Fan Tip Speed is the actual fan tip speed divided by an industry standard temperature correction of "T"/$518.7^{0.5}$. T represents the ambient temperature in degrees Rankine. The Low Corrected Fan Tip Speed according to one non-limiting embodiment of the example engine 20 is less than about 1150 fps (351 m/s).

Figure 2:
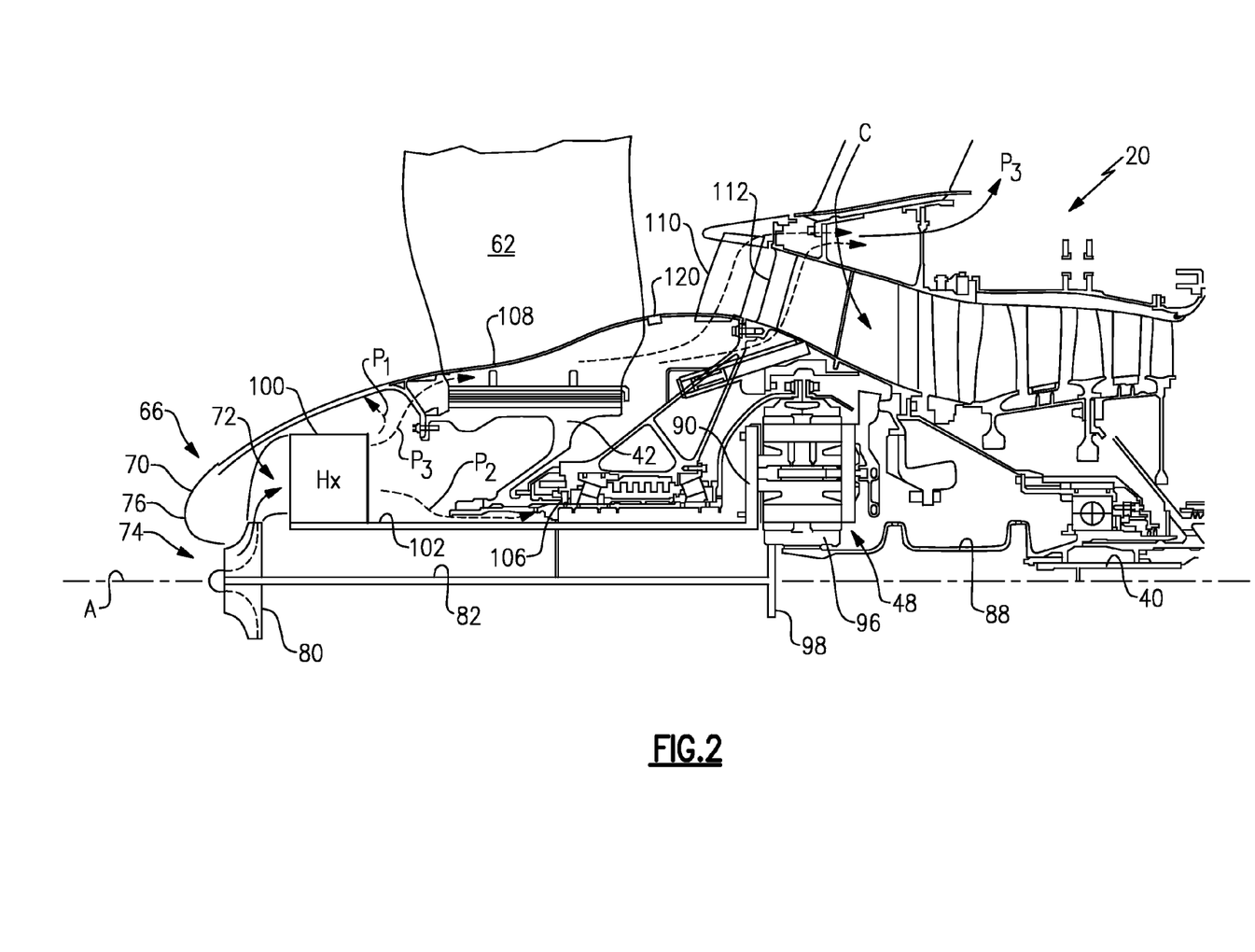
FIG. 2 shows an upper axial half of a front end of the FIG. 1 turbomachine.

Referring now to FIG. 2, the fan rotor 42 of the gas turbine engine 20 includes a plurality of fan blades 62 extending radially from the axis A. The example gas turbine engine 20 also includes a nose cone 66. In this example, the nose cone 66 extends axially forward from the fan blades 62. This nose cone 66 is sometimes referred to as a spinner.

The nose cone 66, in this example, establishes the forwardmost portion of the gas turbine engine 20. The nose cone 66 directs and streamlines flow entering the gas turbine engine 20. An outer surface 70 of the nose cone 66 establishes a portion of a radially inner boundary of a flowpath for flow entering the engine 20. The nose cone 66 may include one piece or several individual pieces.

The nose cone 66 has an interior 72. The nose cone 66 provides an aperture 74 that communicates flow to the interior 72. The aperture 74 may be positioned at a front 76 of the nose cone 66 as shown, or in some other position aft the front 76 of the nose cone 66. The example aperture 74 and the nose cone 66 are coaxially aligned at the axis A. Other alignments of the aperture 74 are possible. A line-ofsite blockage structure may be incorporated to protect the system from birdstrike damage.

In this example, a pump, such as an impeller 80, is used to increase the amount of air entering the interior. The impeller 80 is positioned at least partially within the interior 72 of the nose cone 66. The impeller 80 is driven by rotation during operation. Other example pumps may include an axial fan.

Notably, some examples may not utilize the impeller 80 or any other pump. In such examples, air enters the interior 72 through the aperture 74 due to forward movement of the engine 20. As appreciated, designs incorporating pumps typically move more air to the interior 72 than designs that do not incorporate any pumps. Air can enter the interior 72 through aperture 74 when the exit pressure at the bypass duct inner diameter discharge location can be suppressed below that of the inlet to the nose cone 66. This can occur when the engine 20 is not moving forward, but still turning, like at ground idle.

During operation, the example impeller 80 is rotated by a shaft 82, which is rotated by a shaft 88. The example shaft 88 is a flex coupling shaft. The shaft 88 is driven by the inner shaft 40 of the low-speed spool 30 (FIG. 1). Rotating the shaft 88 rotates a ring gear 96 of the geared architecture 48, which then rotates a gear 98 to rotate the shaft 82.

The example engine 20 includes a heat exchanger 100 positioned near the nose cone 66. In this example, at least a portion of the heat exchanger 100 is forward of the fan blades 62. Air that has entered the interior 72 through the aperture 74 is moved through the heat exchanger 100 to provide a cold side fluid.

The example heat exchanger 100 is a fin and tube type heat exchanger 100, although other type of heat exchangers may also be used. The heat exchanger 100 is annular and distributed about the axis A. In another example, several separate heat exchangers are distributed about the axis A. A support 102 extending axially from a stationary carrier 90 of the geared architecture 48 supports the heat exchanger 100 in this example. The support 102 may also support conduits (not shown) carrying lubricant to the heat exchanger 100.

Air that has entered the interior 72 of the nose cone 66 is pressurized relative to the air outside the nose cone 66. In one example, the difference in pressure between the air within the interior 72 of the nose cone 66 and the air outside the nose cone 66 ranges from 0.5 to 10 psi (3.45 kPa to 68.95 kPa).

Air that has entered the interior 72 of the nose cone 66 is raised to a higher temperature relative to the air outside the nose cone 66. In one example, the difference in temperature between the air within the interior 72 of the nose cone 66 and the air outside of the nose cone 66 ranges from 100° F. to 200° F. (37.78° C. to 93.33° C.).

Lubricant, such as oil from the engine 20, provides the warm side fluid for the heat exchanger 100. Air that has entered the interior 72 is moved through the heat exchanger 100 to remove thermal energy from the lubricant.

The lubricant may be a mixture of lubricant from several areas of the gas turbine engine 20, or may be lubricant from a subset of a lubrication system of the engine 20, such as a fan drive gear system lubrication system. Although the air that has entered the interior 72 is increased in temperature relative to the air outside the nose cone 66, the air that has entered the interior 72 is still significantly cooler than the lubricant within the heat exchanger 100 and therefore can still remove heat from it.

In this example, the heat exchanger 100 is configured to rejection at least 2,900 BTU/min at idle and 5,000 BTU/min and take-off.

Some of the air that has moved through the heat exchanger 100 moves along path $P_1$ and contacts an interior facing side of the nose cone 66. This air adds thermal energy to the nose cone 66, which inhibits ice formation. As appreciated, air moving along path $P_1$ includes more thermal energy that the air moving into the heat exchanger 100 because air that has moved through the heat exchanger 100 has absorbed thermal energy from the lubricant moving through the heat exchanger 100.

Some of the air that has moved through the heat exchanger 100 moves along path $P_2$ and buffers a carbon seal 106 within bearings 38 of the gas turbine engine 20. The carbon seal 106 is a forward carbon seal of the front bearing compartment of the engine 20 in this particular case. The seal 106, in this example, is biased axially rearward by the air.

Most, if not all, of the air that has moved through the heat exchanger 100 eventually moves along path $P_3$. A portion of the path $P_3$ extends radially inward the fan blade platform 108. If additional flow area is need to permit the required flow rate, additional apertures may be included through the Fan Blade Hub Web, which is the same part as the fan rotor 42 in this example, just at a radially inboard. The path $P_3$ also extends through an inlet guide vane 110 and a front center body strut 112. The inlet guide vane 110 and the front center body 112 include internal passages and extend radially across the core flowpath C of the engine 20. The path $P_3$ terminates at the bypass flowpath B of the gas turbine engine 20 behind the FEGV (fan exit guide vanes). Thus, air that has entered the interior 72 through the aperture 74 is eventually expelled into the bypass flowpath B at an axial location having a static pressure that is low enough to enable sufficient flow through the heat exchanger 100.

In addition to the nose cone 66, the air that has moved through the heat exchanger 100 also adds thermal energy to inhibit ice formation on other structures, such as the fan blade platform 108, the inlet guide vane 110, and the front center body struts 112.

In this example, a seal structure 120 seals the interface between the fan rotor 42 and a stationary structure of the gas turbine engine 20. The seal structure 120 limits flow escaping from the path $P_3$, or interior 72, to a position directly aft the fan blade 62. Such leakage into this area may undesirably introduce turbulence to the flow entering the core flowpath C of the gas turbine engine 20.

Figure 3:
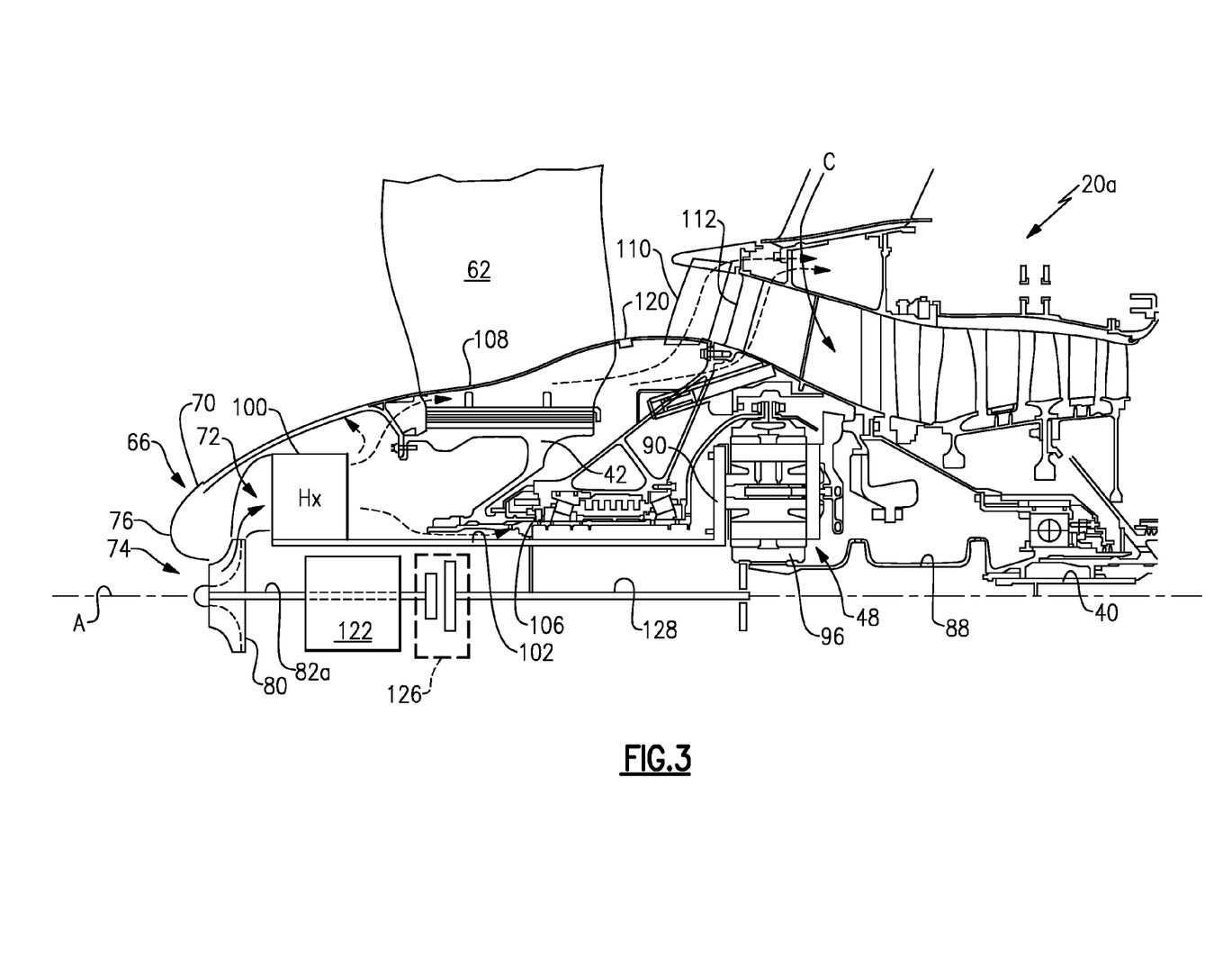
FIG. 3 shows an upper axial half of a front end of another example turbomachine.

Referring to FIG. 3, in another example engine 20a, the impeller 80 is selectively driven by an electric motor 122, which allows relatively infinite adjustments of the rotational speed of the impeller 80. The motor 122 may be used to rotate the impeller 80 when the engine 20 is on the ground, at idle, or at the top of descent. When the motor 122 is not in use, the impeller 80 may be driven using the shaft 88.

In this example, a clutch 126 is moved between an engaged position and a disengaged position to selectively drive the impeller 80 using the electric motor 122 or using the shaft 88. The clutch 126 is an Air Turbine Starter (ATS)-type ratchet clutch in this example.

In the engaged position, the clutch 126 couples together the shaft 128 to a shaft 82a such that rotation of the shaft 128 rotates the shaft 82a. The shaft 82a is directly connected to the impeller 80. That is, rotating the shaft 82a rotates the impeller 80.

The shaft 128 is rotated by the ring gear 96 of the geared architecture 48, which is rotated by the shaft 88. The motor 122 is not driving the shaft 82a when the clutch 126 is engaged. When the motor 122 is running, and driving the impeller 80, the clutch 126 disengages such that the shaft 82a is free to be rotated by the electric motor 122 relative to the shaft 128. In FIG. 3, the clutch 126 is shown in a disengaged position, which corresponds to the electric motor 122 driving the impeller 80.

Figure 4:
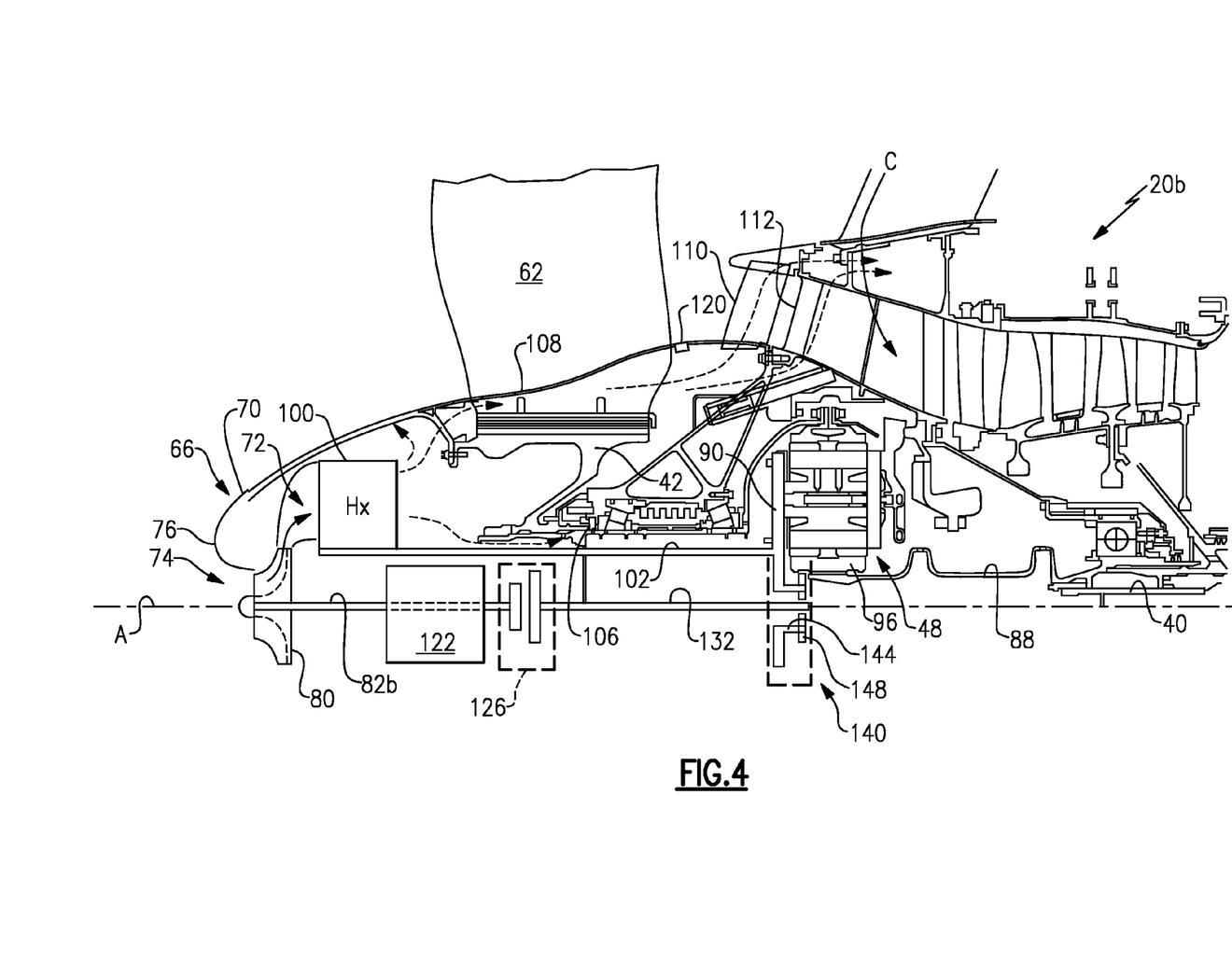
FIG. 4 shows an upper axial half of a front end of yet another example turbomachine.

Referring to FIG. 4, in yet another example engine 20b, the impeller is selectively rotated by the motor 122 or the shaft 132, again selected by a clutch 126. However, in this example, a geared architecture 140 is used to alter the rotational speed of the shaft 132 relative to the shaft 88. In this example, the shaft 88 rotates the ring gear 96 to rotate the geared architecture 140. The geared architecture 140, in turn, rotates the shaft 132 which rotates a shaft 82b that rotates the impeller 80 when the clutch 126 is in the engaged position.

In this example, the stationary carrier 90 of the geared architecture 48 includes extensions 144 that support gears 148 of the geared architecture 140. The gears 148 are planetary gears in this example. Rotating the geared architecture 140 rotates the shaft 82 to drive the impeller 80. The geared architecture 140, in this example, has a gear ratio of about five (5 to 1). That is, when the shaft 88 is used to rotate the impeller 80, one rotation of the shaft 88 rotates the shaft 82 (and the impeller 80) five times.

When the impeller 80 is not rotated by the shaft 88, the impeller 80 is driven by the electric motor 122. The clutch 126 controls the selective rotation of the impeller 80 using the electric motor 122 or shaft 88.

Utilizing the geared architecture 140 enables the impeller 80 to rotate at a faster speed than the shaft 88 when the clutch 126 is engaged. In one example, the gear ratio of the geared architecture 140 is about five (5 to 1). That is, one rotation of the shaft 88 rotates the impeller 80 five times.

Features of the disclosed examples include a thermal management strategy that provides increased space within a core engine nacelle. Another feature is providing thermal energy to limit ice formation on various components at a front of an engine without using a dedicated flow of bleed air from other areas of the engine. Yet another feature is increasing Line Replaceable Unit (LRU) capability since the heat exchanger is located in the nose cone. LRU refers to components external to the engine core (pumps, heat exchangers, etc.) that are relatively easy to change out if they become damaged. Still another feature is greater flexibility to adjust nacelle contours around an engine, which provides a potential performance benefit.

Engine heat loads are typically handled via a combination of fuel/oil and air/oil coolers in the prior art. And although heat loads are typically lower at idle and near idle conditions, the associated lower fuel flow rate at these conditions significantly lessens the ability of the fuel/oil coolers to reject heat. The specific features of the embodiments shown in FIGS. 3 and 4, specifically the TMS pump being rotated by a motor or a dedicated gear set at much higher speeds than could be accomplished by directly driving the pump with a turbine shaft, thus compensate for the natural drop-off in heat rejection capability in prior art configurations at idle and near-idle conditions.

Rotating the pump via the planetary gear system as shown in the FIG. 4 embodiments allows the pump to rotate faster than the shaft rotated by the turbine. In this manner the disclosed examples effectively replaces three systems (spinner anti-ice, front bearing compartment buffering, and TMS cooling).

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A turbomachine assembly, comprising:
a nose cone of a turbomachine;
a pump at least partially within an interior of the nose cone, the pump selectively driven by a motor to communicate air to the interior;
wherein the pump is selectively rotated by the motor or a shaft directly driven by a turbine of the turbomachine; and
a clutch that is selectively moved between an engaged position and a disengaged position to rotate the pump using the motor or the shaft.

2. The turbomachine assembly of claim 1, wherein the pump communicates air through an aperture provided by a leading edge of the nose cone relative to a direction of flow through the turbomachine.

3. The turbomachine assembly of claim 1, wherein the nose cone establishes a portion of a radially inner boundary of flow entering a fan section of the turbomachine.

4. The turbomachine assembly of claim 1, including a geared architecture rotatably linking a fan to the shaft, the geared architecture causing the fan to rotate at a different speed than the shaft.

5. The turbomachine assembly of claim 1, wherein the clutch is a ratchet clutch.

6. The turbomachine assembly of claim 1, wherein the clutch is in the engaged position when rotating the pump using the shaft.

7. The turbomachine assembly of claim 1, wherein the shaft directly drives the pump at a 1 to 1 ratio when the clutch is in the engaged position.

8. The turbomachine assembly of claim 1, including a heat exchanger that receives air communicated to the interior by the pump.

9. The turbomachine assembly of claim 8, wherein the heat exchanger is forward a fan blade section of the turbomachine relative to a direction of flow through the turbomachine.

10. The turbomachine assembly of claim 8, wherein air communicated to the interior by the pump carries thermal energy from the heat exchanger.

11. The turbomachine assembly of claim 1, wherein air that has moved to the interior adds thermal energy to the nose cone.

12. The turbomachine assembly of claim 1, wherein air that has moved to the interior buffers a seal.

13. The turbomachine assembly of claim 1, wherein the turbomachine has a bypass flowpath, and air that has moved through to the interior is communicated from an inner diameter of a core flowpath to an outer diameter of the core flowpath.

14. A turbomachine assembly, comprising:
a nose cone of a turbomachine; and
a pump at least partially within an interior of the nose cone, the pump selectively driven by a motor to communicate air to the interior;
wherein an inlet to a low pressure compressor of the turbomachine is downstream from the fan relative to a general direction of flow through the turbomachine.

15. A turbomachine assembly, comprising:
a nose cone having an interior extending forward a fan section of a turbomachine;
a pump that is selectively driven by a shaft or a motor to communicate air to the interior, wherein the pump rotates at the same speed as the shaft when the pump is driven by the shaft, and the pump rotates at the same speed as the motor when the pump is driven by the motor; and
a clutch that is selectively moved between an engaged position and a disengaged position to rotate the pump using the motor or the shaft.

16. The turbomachine assembly of claim 15, wherein the shaft rotates at the same speed as a low-speed spool of the turbomachine when the pump is driven by the shaft.

17. The turbomachine assembly of claim 15, including a geared architecture that is driven by the shaft to rotate a fan of the turbomachine at a higher rotational speed than the shaft.

18. The turbomachine assembly of claim 15, wherein the fan section that drives air along a bypass flowpath defined by a bypass duct, and air that has moved through to the interior is communicated from an inner diameter of a core flowpath defined by a compressor section to an outer diameter of the core flowpath, the bypass flow path radially outward of the core flow path with respect to an engine longitudinal axis.

19. The turbomachine assembly of claim 15, wherein an inlet to a low pressure compressor of the turbomachine is downstream from the fan section relative to a general direction of flow through the turbomachine.

20. A method of communicating air within a turbomachine, comprising:
using a pump to move air along a path from a first position outside a nose cone interior directly to a second position within the nose cone interior; and
selectively driving the pump using a shaft or a motor, including selectively moving a clutch between an engaged position and a disengaged position to rotate the pump using the motor or the shaft;
wherein the pump rotates at the same speed as the shaft when the pump is driven by the shaft, and the pump rotates at the same speed as the motor when the pump is driven by the motor.

21. The method of claim 20, wherein an inlet to a low pressure compressor of the turbomachine is downstream from a fan relative to a general direction of flow through the turbomachine, the nose cone being axially forward from a plurality of fan blades of the fan.

* * * * *